Feb. 19, 1952   M. P. GRAHAM   2,586,646
JOINT
Filed March 29, 1946
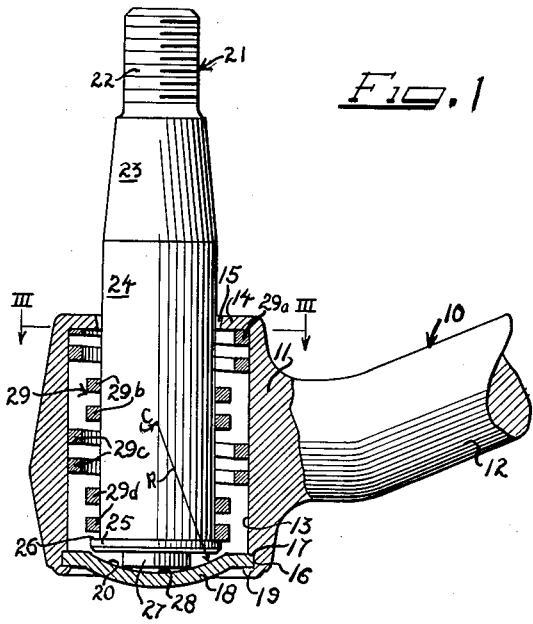
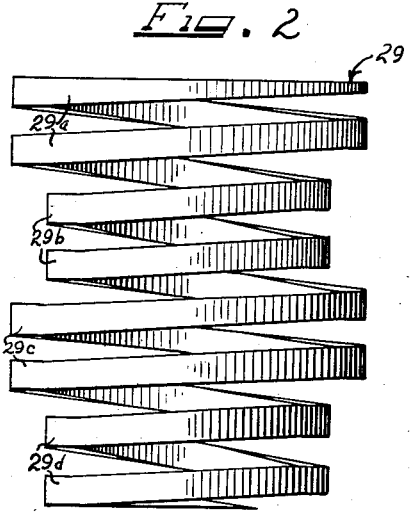
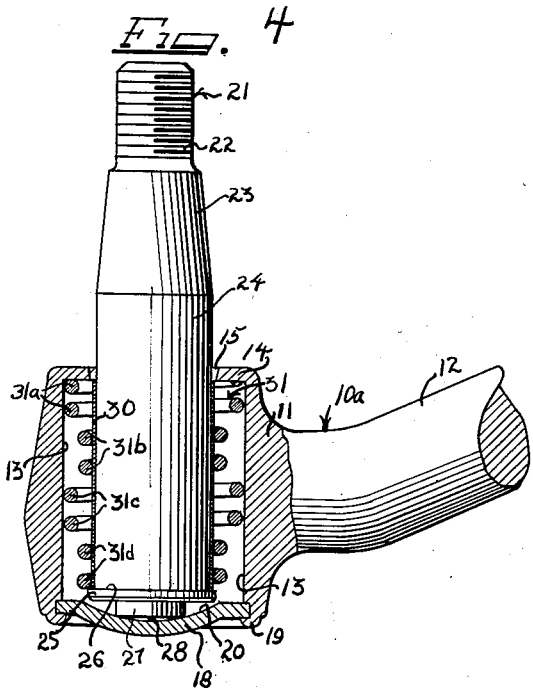
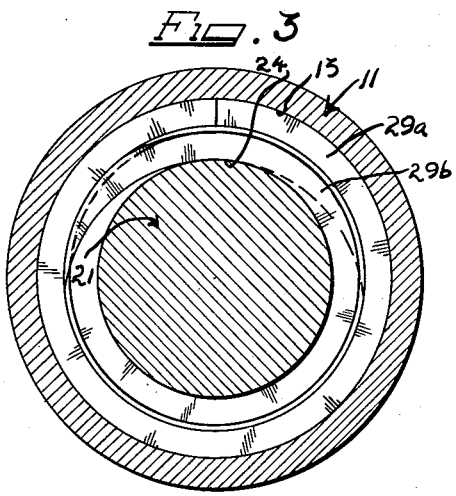
Inventor
Matthew P. Graham

UNITED STATES PATENT OFFICE 2,586,646

JOINT

Matthew P. Graham, Detroit, Mich., assignor to Thompson Products, Inc., Cleveland, Ohio, a corporation of Ohio Application March 29, 1946, Serial No. 658,046

3 Claims. (Cl. 287—90)

This invention relates to joint assemblies wherein a coiled spring mounts the joint parts for relative movement. Specifically the invention deals with a tie rod joint assembly wherein a coiled spring carries the joint stud in the joint socket for tilting and rotating movements relative to the socket.

The invention will hereinafter be specifically described as embodied in a tie rod joint for the steering linkage of an automotive vehicle but it should be understood that the invention is not limited to the specifically described and illustrated embodiment since the principles of this invention are generally applicable to joint constructions.

The tie rod joints of this invention are each composed of a stud with a shank having the conventionally tapered portion for receiving the eye end of a steering arm and a threaded end portion for receiving a nut to lock the eye on the tapered portion. However, the stud shank instead of having a headed end portion for mounting in the socket of the joint, is only equipped with a flange at the end thereof remote from the threaded end. The main body portion of the stud shank is cylindrical and extends from the large end of the tapered portion to the flange. The bottom of the stud under the flange has a rounded button thereon. The socket has a straight cylindrical bore extending inwardly from one end thereof to an end wall which is apertured to receive the stud shank therethrough. The socket is closed by a disk or plug having a concave face in the socket for receiving the rounded button of the stud in bearing engagement therewith. A coil spring is disposed between the cylindrical portion of the stud in the socket and the wall defining the bore of the socket. One end coil of the spring is bottomed on the apertured end wall of the socket. The other end coil of the spring is bottomed on the flange of the stud. The spring has alternate groups of small diameter and large diameter turns or coils for respectively engaging the stud shank and the socket bore. The spring accommodates rotation of the stud within the small diameter turns or coils thereof and the stud can tilt relative to the socket by tilting of the small diameter coils relative to the large diameter coils.

It is then an object of this invention to provide a joint assembly wherein the joint parts are operatively mounted by means of a spring.

Another object of the invention is to provide a joint assembly wherein a coil spring mounts the joint parts for relative rotating and tilting movements.

A further object of the invention is to eliminate the heretofore necessary bearing surfaces for tie rod type joints by utilizing coil springs to carry the joint stud in the joint housing.

A still further object of the invention is to provide a tie rod joint composed of a socket with a cylindrical bore and a stud with a cylindrical shank wherein a single coil spring having alternating large diameter and small diameter turns or coils operatively embraces the stud to place the stud and socket in relatively rotatable and tiltable relation.

A still further object of the invention is to provide a tie rod type eye assembly wherein a stud with a cylindrical shank receives a sleeve in rotatable relation therearound and wherein the sleeve is tiltably mounted in a socket by means of a coil spring having small diameter coils embracing the sleeve and large diameter coils snugly seated in the socket.

Other and further objects of the invention will be apparent to those skilled in the art from the following detailed description of the annexed sheet of drawings which, by way of preferred example only, illustrates two embodiments of the invention.

On the drawings:

Figure 1 is a fragmentary side elevational view with parts in vertical cross section of a tie rod joint according to this invention.

Figure 2 is a side elevational view of a coil spring of the joint of Fig. 1.

Figure 3 is a horizontal cross sectional view taken along the line III—III of Fig. 1.

Figure 4 is a view similar to Fig. 1 but illustrating a modified joint construction according to this invention.

As shown on the drawings:

In Fig. 1 the reference numeral 10 designates generally a joint construction composed of a socket or housing 11 having a laterally projecting shank or stem 12 for attachment to a tie rod or the like (not shown). The housing 11 has a cylindrical bore 13 extending inwardly from one end thereof to an end flange or wall 14 at the other end thereof. The wall 14 is apertured at 15.

The bore 13 has a counterbore 16 in the open end thereof cooperating therewith to define a shoulder 17. A closure disk or plug 18 is seated in the counterbore 16 against the shoulder 17 and is secured to the housing 11 by spinning over the rim portion of the housing at the free end of the counterbore to provide a closure flange 19 underlying the peripheral margin of the disk 18. The disk 18 has a dished or concave wall portion 20 in the housing 11.

The joint 10 also includes a stud 21. Stud 21 has a cylindrical threaded top end portion 22, a tapered intermediate portion 23 and a cylindrical main body portion 24 extending from the large end of the tapered portion 23. The cylindrical portion 24 terminates in an end flange 25 providing a shoulder 26 around the bottom of the cylindrical portion. A lug 27 depends from the central portion of the bottom of the stud beneath the flange 25. This lug 27 has a convex or rounded end wall 28.

The cylindrical portion 24 of the stud 21 fits freely in the aperture 15 of the socket 11 but the flange 25 is of larger diameter than this aperture. The end wall 28 on the lug 27 of the stud 21 mates with and rides on the concave wall 20 of the closure disk 18. The stud can thereby readily tilt in the socket 11.

The joint also includes a coiled spring 29 which mounts the stud in the socket for relative rotating and tilting movements. The spring 29 as illustrated is composed of wire or rod having a square cross section. The spring 29 has alternating groups of large diameter coils and small diameter coils, with the large diameter coils sized to snugly fit in the bore 13 of the socket 11 and with the small diameter coils sized for snugly embracing the cylindrical portion 24 of the stud 21. A group of large diameter coils is provided at one end of the spring and a group of small diameter coils is provided at the other end of the spring. As shown, the spring 29 has a large diameter coil 29a at one end thereof bottomed on the wall 14 and snugly engaging the bore 13 of the socket 11. This end coil 29a extends for two full turns around the spring and then enters a small diameter coil 29b which snugly embraces the stud portion 24 for two full turns. The small coil 29b then again extends to a large diameter coil 29c again snugly embracing the bore 13 of the socket 11 for two full turns. The coil 29c then extends to a small diameter coil 29d again snugly embracing the portion 24 of the stud 21 and bottomed on the shoulder 26 provided by the flange 25 of the stud.

The spring 29 is held under compression between the shoulder 26 of the stud and the wall 14 of the socket by the closure disk or plug 18 which acts on the rounded end 28 of the lug 27 on the stud. The end coils of the spring are thereby maintained in engagement with the stud and socket respectively and the rounded end of the stud is maintained in riding engagement with the concave wall 20 of the plug 18. The wall 20 and the rounded end 28 preferably have fragmental spherical contours struck from a radius centered on the tilting center for the stud as shown by the radius R centered on the tilting center C for the stud.

The square cross section of the coil wire or rod provides cylindrical inner and outer walls for the spring which have full seating engagement with the cylindrical bore 13 of the socket 11 and the cylindrical portion 24 of the stud 21. The stud 21 can thereby rotate by its own axis in the coils 29b and 29d of the spring. In addition the stud can tilt in any plane relative to the housing 11 since the small diameter coils 29b and 29d can flex and be cocked relative to the large diameter coils 29a and 29c without unseating either group of coils from their respective seating surfaces. The tilting movement is maintained about the center C since the compression of the spring causes the lug on the end of the stud to ride on the closure plug for the socket.

If desired according to this invention wire of circular cross section can be used to form the spring. In such constructions, however, it is preferable to use a sleeve surrounding the stud so that the stud can freely rotate within the coil spring. Therefore, in the joint 10a of Fig. 4 parts identical with parts described in connection with Figs. 1 and 3 have been marked with the same reference numerals. As shown in Fig. 4, the cylindrical main body portion 24 of the stud 21 receives a cylindrical sleeve 30 therearound bottomed on the shoulder 26 of the stud flange 25. This sleeve 30 is preferably split or formed in two longitudinal halves so that it can be maintained in good bearing contact with the stud. The sleeve is preferably composed of a self-lubricating material such as graphite impregnated bronze, lubricant impregnated porous sintered powdered metal, or the like.

The coil spring 31 for the joint 10a is composed of wire or rod of circular cross section as shown. It has large diameter end coils 31a seated in the bore 13 of the socket 11 and bottomed on the end wall 14 of the socket. These coils merge into small diameter coils 31b snugly embracing the sleeve 30 on the stud. The coils 31b then extend to large diameter coils 31c embracing the bore 13. The coils 31c then extend to small diameter end coils 31d embracing the sleeve 30 and bottomed on the flange shoulder 26 of the stud. The stud will rotate in the sleeve 30 and the spring will accommodate relative tilting of the stud and socket as explained hereinabove.

The major diameter coils of the springs for the studs of this invention are preferably wound so that they are slightly larger than the inside diameter of the socket. This arrangement insures a tight fit between the spring and the socket. The small diameter coils of the spring are likewise slightly smaller than the stud portion on which they are seated so that when the stud is pushed through the spring the small diameter coils will unwind slightly to effect a snug turning fit relationship between the stud and the spring. When the spring with the stud therein is pushed into the socket, the spring will elongate slightly. The plug or closure disk is then set into position in the socket and as explained above effects a compression of the spring so that the lug end 28 of the stud will be urged against the wall 20 of the closure plug. A fixed tilting center C is thereby maintained for the stud.

The spring always returns the stud to a position parallel with the axis of the socket. However, as explained, the spring will permit relative tilting of the stud and socket in all planes while accommodating rotation of the stud in the spring.

From the above descriptions it will be understood that this invention provides an inexpensive joint construction wherein a coiled spring operatively mounts the joint parts for coaction.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint construction comprising a socket having a bore extending inwardly from one end thereof to an apertured end wall providing a shoulder in the bore, a stud projecting freely through the apertured end wall of the socket and having a cylindrical portion disposed in said bore in spaced relation therefrom, a flange on said stud in said bore providing a shoulder at the end of the cylindrical portion, a lug depending from said flanged portion of the stud and having a rounded end wall, a closure plug secured to the socket in the open end of the bore having a concave portion receiving the rounded end of the lug, and a single coil spring having large diameter coils snugly seated in said bore and small diameter coils snugly embracing said cylindrical portion of the stud, one of the small diameter coils being bottomed on the shoulder provided on the stud by said flange and one of the large diameter coils being bottomed on the shoulder provided by the end wall of the housing, said stud being rotatable within said small diameter coils and said small diameter coils being spaced from said large diameter coils to permit tilting of the stud in all planes relative to the socket without unseating the large diameter coils from the socket bore.

2. A joint for automotive steering linkages and the like comprising a housing having a cylindrical bore extending inwardly from one end face thereof to an apertured end wall at the other end face thereof, a stud having a cylindrical shank extending freely through said apertured end wall into said bore, a flange on said shank in said bore of smaller diameter than the bore but of larger diameter than the aperture in said end wall, a rounded end on said stud in said bore, a closure member secured to the housing for closing the bore, said closure member having a concave face in said bore securing said rounded end of the stud thereon, said concave face being struck from a radius centered on the desired tilting center for the stud, and a coil spring compressed between the end wall of the housing and the flange of the stud having alternate large diameter coils engaging the bore and small diameter coils engaging the stud to mount the stud for rotation and tilting in the housing.

3. A joint for automotive steering linkages and the like comprising a housing having a cylindrical bore extending inwardly from one end face thereof to an apertured end wall at the other end face thereof, a stud having a cylindrical shank extending freely through said apertured end wall into said bore, a flange on said shank in said bore of smaller diameter than the bore but of larger diameter than the aperture in said end wall, a rounded end on said stud in said bore, a closure member secured to the housing for closing the bore, said closure member having a concave face in said bore securing said rounded end of the stud thereon, said concave face being struck from a radius centered on the desired tilting center for the stud, a sleeve in said bore embracing said stud in rotatable relation thereon, and a coil spring compressed between the end wall of the housing and the flange of the stud having alternate large diameter coils engaging the bore and small diameter coils engaging the sleeve to mount the stud for tilting with the sleeve in the housing and for rotation of the stud in the sleeve.

MATTHEW P. GRAHAM.

REFERENCES CITED

The following references are of record in the file of this patent:

UNITED STATES PATENTS

| Number | Name | Date |
| --- | --- | --- |
| 659,874 | Rabbeth | Oct. 16, 1900 |
| 985,518 | Elers | Feb. 28, 1911 |
| 986,274 | Finkelstein | Mar. 7, 1911 |
| 1,077,410 | Kling | Nov. 4, 1913 |
| 1,264,742 | Aldrich | Apr. 30, 1918 |
| 1,555,822 | Benjamin | Oct. 6, 1925 |
| 1,639,336 | Gannett | Aug. 16, 1927 |
| 2,076,028 | Hufferd | Apr. 6, 1937 |

FOREIGN PATENTS

| Number | Country | Date |
| --- | --- | --- |
| 280,933 | Great Britain | Nov. 17, 1927 |
| 771,366 | France | July 23, 1934 |